United States Patent
Wakamatsu et al.

(10) Patent No.: US 6,819,268 B2
(45) Date of Patent: Nov. 16, 2004

(54) RECEIVED INFORMATION PROCESSING APPARATUS

(75) Inventors: Kotaro Wakamatsu, Iwaki (JP); Hiroyuki Nemoto, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 610 days.

(21) Appl. No.: 10/037,500

(22) Filed: Oct. 18, 2001

(65) Prior Publication Data

US 2002/0067288 A1 Jun. 6, 2002

(30) Foreign Application Priority Data

Dec. 5, 2000 (JP) .......................................... 2000-369780

(51) Int. Cl.$^7$ .............................................. G08G 1/123
(52) U.S. Cl. ............... 340/988; 340/995.1; 340/995.12; 340/995.17; 701/200
(58) Field of Search ................................ 340/988, 991, 340/992, 995.1, 995.12, 995.13, 995.17, 995.19, 995.25, 995.27, 995.28; 701/200, 201, 207, 208, 210

(56) References Cited

U.S. PATENT DOCUMENTS 5,959,580 A * 9/1999 Maloney et al. ............. 342/457
6,012,028 A * 1/2000 Kubota et al. .............. 704/260
6,061,003 A * 5/2000 Harada ................... 340/995.15
6,115,667 A 9/2000 Nakamura .................. 701/200
6,629,035 B2 * 9/2003 Seto et al. .................. 701/208
6,697,631 B1 * 2/2004 Okamoto .................... 455/457

* cited by examiner

Primary Examiner—Toan N. Pham
(74) Attorney, Agent, or Firm—Brinks Hofer Gilson & Lione

(57) ABSTRACT

A received information processing apparatus enables simplification of user manipulation when information relevant to an area is to be acquired. A position information extraction section extracts predetermined position information (for instance, postal codes) corresponding to the vehicle position calculated by a vehicle position calculation section. A received information extraction section extracts received information relevant to a specified area from among various kinds of information included in a data broadcast received by a digital broadcast receiver, based on position information received from the position information extraction section and predetermined extraction conditions stored in an extraction conditions storage section. Depiction data corresponding to the extracted received information is generated by a received information depiction section, and the content of the received information that is relevant to the vehicle position is displayed on a screen of a display device.

20 Claims, 8 Drawing Sheets

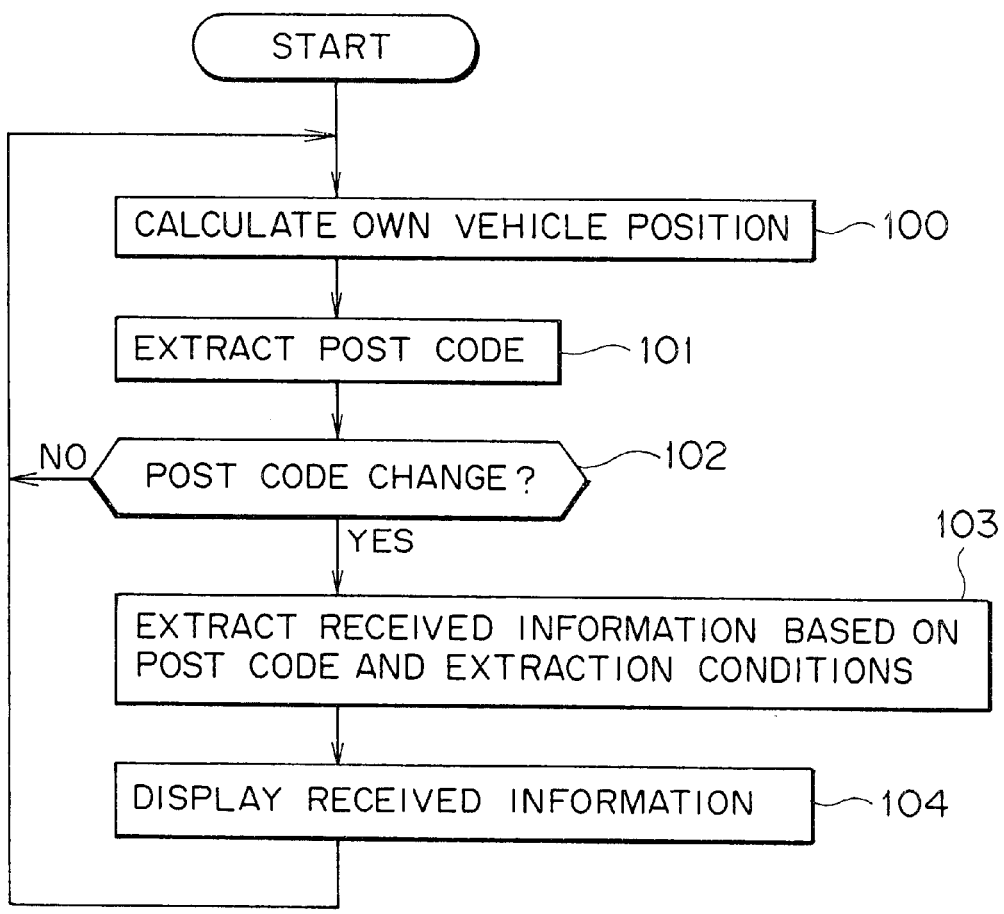

FIG.6

| EXTRACTION CONDITIONS | |
|---|---|
| GENRE CONDITIONS | AREA CONDITIONS |
| WEATHER FORECAST | AREA NAME<br>FOLLOWING UP MODE |
| EVENT INFORMATION | |
| TRAFFIC INFORMATION | |

110: RECEIVED INFORMATION

RECEIVED INFORMATION PROCESSING APPARATUS

BACKGROUND OF THE INVENTION

1. Field of the Invention

The present invention relates to a received information processing apparatus for executing various kinds of processing in connection with the received information in such a way as to receive information relevant to a specified target area.

2. Description of the Related Art

Recently, various kinds of broadcast have been changed into a digital system from an analog system. For instance, CS (Communication Satellite) digital broadcast, BS (Broadcasting Satellite) digital broadcast, and surface wave digital broadcast are due to start or have started. In general, since broadcasting from a digital system makes it possible to utilize radio waves effectively in comparison with conventional broadcasting from an analog system, it is possible to multiplex many programs onto one broadcast signal.

In the various kinds of digital broadcast, data broadcast is scheduled in addition to broadcasting of image and audio. In this data broadcast, various kinds of information such as a program guide of respective channels, news, weather forecast, life information and so forth are transmitted. Further, in the surface wave digital broadcast and so forth, data broadcast for a mobile body such as vehicle is scheduled as an exception to data broadcast for the general home and so forth, whereby data can be broadcast including particularly useful information such as traffic information, event information and so forth, about the mobile body.

A user interface is an electric program guide EPG (Electric Program Guide) that facilitates use of the service being realized by the data broadcast. In this EPG, it is possible to confirm information such as the title of respective programs, start/end time of the program, contents of the program and so forth while providing a menu on the screen, and to execute picture recording reservation. Further, it is possible to select for display various kinds of information such as the aforementioned weather forecast.

Moreover, the weather forecast, the traffic information and so forth from among the various kinds of information transmitted by the data broadcast are information for which an area relevant to the information becomes important. In some cases, target area information whose target area is specified may be added to the information. Target area information may be, for instance, a postal code or area name (regional name, prefectural and city government name, local authority name and so forth). The user is capable of acquiring information such as the weather forecast relevant to a position by specifying the postal code and/or area name, etc. corresponding to the required position by using the EPG.

When a user who is travelling in the vehicle receives the aforementioned data broadcast, the frequency of acquiring information relevant to the position (area) can be increased above all other kinds of information. For instance, it is possible to indicate that the user requires information, the weather forecast, and event information such as traffic information relevant to the user's vehicle position, destination, and so forth. In such a case, conventionally, the user should acquire information relevant to the desired area by executing a search operation to specify the postal code and/or the area name while utilizing EPG, and further to specify the genre of information that the user desires to acquire. Thus, the operation becomes complicated.

SUMMARY OF THE INVENTION

The present invention has been made in consideration of the above-mentioned points, and an object of the present invention is to provide a received information processing apparatus in which the acquisition of information relevant to a desired area is simplified.

In order to achieve the aforementioned object, in the received information processing apparatus of the present invention, information whose target area is specified is received by a reception section from among information delivered depending on the broadcasting medium, and position information for specifying an area is extracted by a position information extraction section, wherein a received information display section selectively extracts for display the information relevant to the area from among the information received by the reception section on the basis of the position information extracted by the position information extraction section. Since the position information is extracted automatically, and the information relevant to the area that is specified by the position information is extracted selectively for display, it is possible to simplify user manipulation when acquiring information relevant to the specified area.

There is further provided a vehicle position detection section for detecting the current position of the vehicle, and it is desirable that extraction of the position information is executed by the aforementioned position information extraction section while matching the current position of the vehicle detected by the vehicle position detection section. According to this feature, in the course of travel, it is possible to selectively extract for display the information relevant to the area corresponding to the current position of the vehicle.

There is further provided a specification section for specifying a position on a map, and it is advantageous that extraction of the position information is executed by the aforementioned position information extraction section while matching a position on the map specified by the specification section. According to this feature, a desired position on the map is specified, then it is possible to selectively extract for display the information relevant to the area corresponding to this position.

There is further provided a storage section for storing information received by the reception section, and it is desirable that the information relevant to the area specified on the basis of the position information is selectively extracted for display from among the information stored in the storage section by the aforementioned received information display section. It becomes possible to extract the information relevant to the area from among the reception contents stored in the storage section in real-time because the reception contents are stored, thus it is possible to increase the amount of information as the extraction object. Further, even in cases where the reception operation by the reception section is not executed, it is possible to extract for display the information relevant to an area by using the reception contents stored in the storage section.

According to a first aspect of the present invention, there is provided an information processing apparatus which comprises a reception section for receiving information whose target area is specified from among information delivered by use of a broadcasting medium, a position information extraction section for extracting position information for specifying an area, and a received information display section for selectively extracting for display the information relevant to the specified area on the basis of the position information extracted by the position information extraction section from among the information received by the reception section.

According to a second aspect of the present invention, in the first aspect, the received information processing apparatus further comprises a vehicle position detection section for detecting the current position of the vehicle, wherein the position information extraction section extracts the position information while matching the current position of the vehicle as detected by the vehicle position detection section.

According to a third aspect of the present invention, in the first aspect, the received information processing apparatus further comprises a specification section for specifying a position on a map, wherein the position information extraction section extracts the position information while matching the position on the map specified by the specification section.

According to a fourth aspect of the present invention, in the first aspect, the received information processing apparatus further comprises a storage section for storing the information received by the reception section, wherein the received information display section selectively extracts for display the information relevant to the area on the basis of the position information from among the information stored in the storage section.

According to a fifth aspect of the present invention, in the first aspect, the position information extracted by the position information extraction section is a postal code.

According to a sixth aspect of the present invention, in the first aspect, the position information extracted by the position information extraction section is a telephone number.

According to a seventh aspect of the present invention, in the first aspect, the position information extracted by the position information extraction section is an area name.

According to an eighth aspect of the present invention, in the first aspect, the received information display section displays information extracted selectively and a map of a target area.

According to a ninth aspect of the present invention, in the first aspect, information relevant to the area is at least one from among weather information, traffic information and event information.

According to a tenth aspect of the present invention, in the first aspect, the received information processing apparatus further comprises an extraction conditions storage section for storing genre of information which is extracted from among the information, wherein the received information display section extracts for display information which is associated with the area and which belongs to the genre stored in the extraction conditions storage section from among information received by the reception section.

According to an eleventh aspect of the present invention, there is provided a received information processing method which comprises receiving a data broadcast which delivers information relevant to an area by use of a broadcasting medium, along with position information; detecting the vehicle position; extracting position information corresponding to the vehicle position; and extracting for display information relevant to the area surrounding the vehicle position from among the data broadcast based on the position information.

According to a twelfth aspect of the present invention, in the eleventh aspect, the received information processing method further comprises extracting for display information relevant to the area of the vehicle position and displaying simultaneously a map to which the vehicle position belongs.

According to a thirteenth aspect of the present invention, there is provided a received information processing method which comprises receiving a data broadcast which delivers information relevant to an area by use of a broadcasting medium, along with position information; extracting position information for specifying an area to which a position specified on the map belongs; and extracting for display information relevant to the area on the basis of the position information.

According to a fourteenth aspect of the present invention, in the thirteenth aspect, the received information processing method further comprises extracting for display information relevant to said area, and displaying simultaneously a map of the area surrounding the specified position.

According to a fifteenth aspect of the present invention, in the thirteenth aspect, the information relevant to the area is at least one from among weather information, traffic information and event information.

According to a sixteenth aspect of the present invention, in the thirteenth aspect, the received information processing method further comprises storing the information which is received, and selectively extracting for display the information relevant to the area from among the information stored on the basis of the position information.

According to a seventeenth aspect of the present invention, in the eleventh aspect, the position information comprises postal codes, and information relevant to the area matched with the postal code is extracted for display from among the data broadcast.

According to an eighteenth aspect of the present invention, in the eleventh aspect, the position information comprises telephone numbers, and information relevant to the area matched with the telephone number is extracted for display from among the data broadcast.

According to a nineteenth aspect of the present invention, in the eleventh aspect, the position information comprises area names, and information relevant to the area matched with the area name is extracted for display from among the data broadcast.

According to a twentieth aspect of the present invention, in the eleventh aspect, the received information processing method further comprises setting genre of information which is extracted previously from among the information, and extracting for display information which is associated with the area and which belongs to the set genre from among the information.

BRIEF DESCRIPTION OF THE DRAWINGS

FIG. 2 illustrates one example of extraction conditions stored in an extraction conditions storage section;

FIG. 3 is a flowchart illustrating the operational procedure of a navigation system when received information is superimposed on a map for display;

FIG. 6 illustrates one example of extraction conditions stored in an extraction conditions storage section of the second embodiment;

DESCRIPTION OF THE PREFERRED EMBODIMENT

A navigation system of a first embodiment to which the present invention is applied will be described below with reference to the accompanying drawings.

[First Embodiment]

Figure 1:
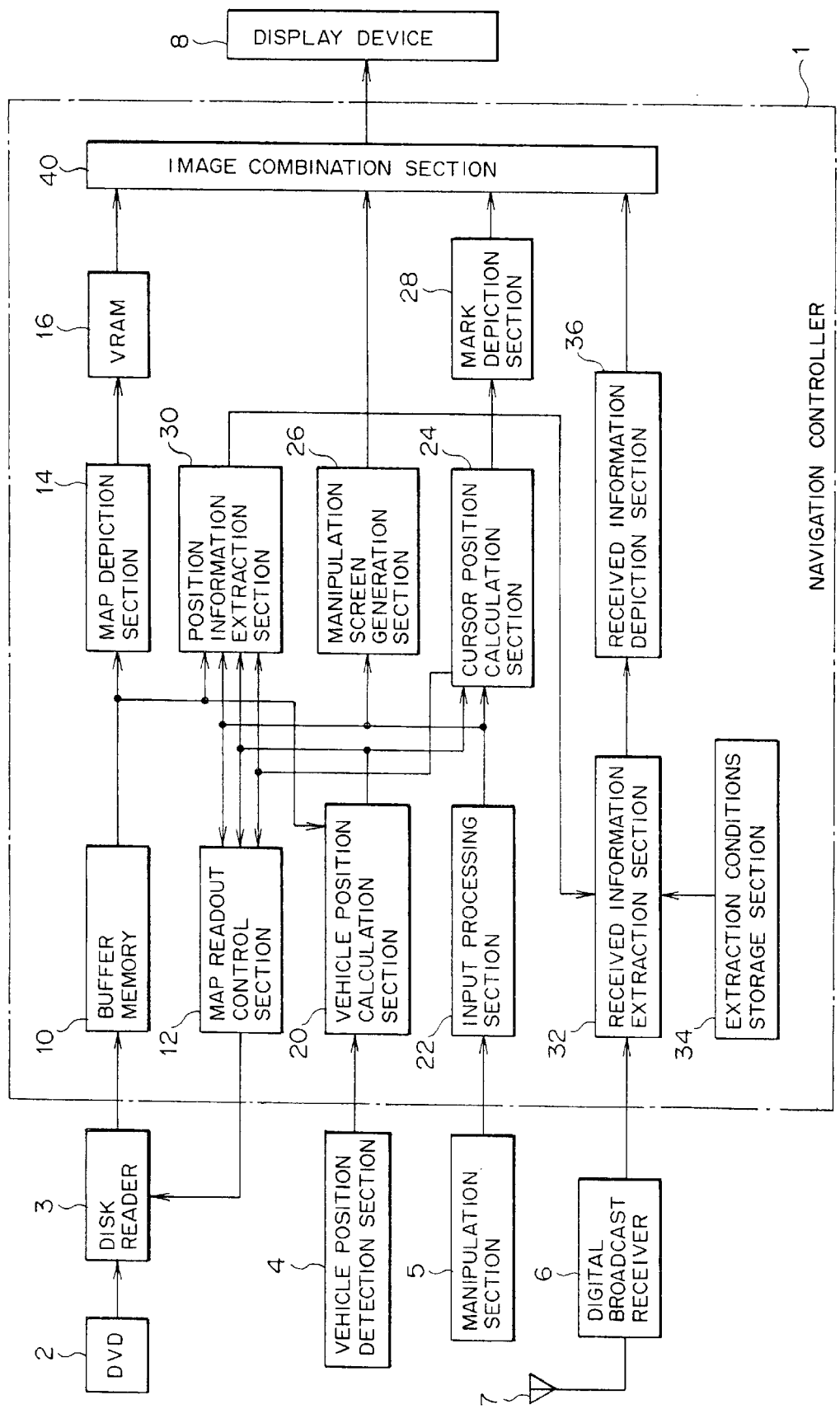
FIG. 1 is a block diagram illustrating the configuration of a navigation system of a first embodiment.

FIG. 1 is a block diagram illustrating the configuration of the navigation system of the first embodiment. The navigation system illustrated in FIG. 1 comprises a navigation controller 1, a DVD 2, a disk reader 3, a vehicle position detection section 4, a manipulation section 5, a digital broadcast receiver 6, and a display device 8.

The navigation controller 1 controls the overall operation of the navigation system. In general, the navigation controller 1 comprises CPU, ROM, RAM and so forth, and its function is realized by executing a predetermined operation program. The detailed configuration of the navigation controller 1 will be described later. It is advantageous that the operation program for realizing the function of the navigation controller 1 is read at the starting time of the navigation system with the operation program being stored in the DVD 2.

The DVD 2 is an information storage medium in which the map data necessary for map display and/or for searching various kinds of information and so forth is stored. To be more precise, the DVD 2 stores map data in which a rectangular shaped single figure partitioned by predetermined latitude and longitude is taken to be a unit, and the map data of respective figures is determined by specifying a figure number. Thus, it becomes possible to read out the map data by specifying the figure number.

Furthermore, the map data contains an area search database which relates the area name, such as a prefectural, city or local authority name, postal code, and telephone number to coordinates (latitude, longitude) of points on the map corresponding thereto. By the use of this area search database, it is possible to specify the postal code or the like in order to extract the latitude/longitude of the city and so forth of the corresponding area, then the latitude/longitude is set as the destination for route searching.

The disk reader 3 is capable of receiving one or a plurality of DVD 2 and executes readout of the map data from one of the DVD 2 depending on control from the navigation controller 1. Incidentally, the loaded disk is not necessarily a DVD; a CD is also possible. Further, it is possible that both the DVD and the CD may be loaded selectively.

The vehicle position detection section 4 is provided with, for instance, a GPS receiver, a direction sensor, a distance sensor and so forth, and detects the vehicle position (latitude, longitude) with a predetermined timing to provide the detection result.

The manipulation section 5 is provided with various kinds of operation keys such as cursor keys (up/down and right/left) and setting keys for executing selected items at a cursor position on a display screen, and generates signals depending on the manipulation state of the keys to the navigation controller 1.

The digital broadcast receiver 6 receives a digital broadcast through an antenna 7. Specifically, the digital broadcast received by the digital broadcast receiver 6 contains image, audio, and data broadcast providing various kinds of information. Such a digital broadcast contains, for instance, a BS digital broadcast.

The display device 8 displays map information of the area surrounding the vehicle position, the program indicating the contents of a broadcast, and various kinds of information received by the digital broadcast receiver 6 on the basis of data provided from the navigation controller 1.

Next, the detailed configuration of the navigation controller 1 will be described. The navigation controller 1 illustrated in FIG. 1 comprises a buffer memory 10, a map readout control section 12, a map depiction section 14, a VRAM 16, a vehicle position calculation section 20, an input processing section 22, a cursor position calculation section 24, a manipulation screen generation section 26, a mark depiction section 28, a position information extraction section 30, a received information extraction section 32, an extraction conditions storage section 34, a received information depiction section 36, and an image combination section 40.

The buffer memory 10 temporarily stores therein map data read out from the DVD 2 by the disk reader 3.

The map readout control section 12 provides the readout requirement of the map data of a predetermined range depending on the vehicle position calculated by the vehicle position calculation section 20, the cursor position calculated by the cursor position calculation section 24, and/or a requirement from the input processing section 22.

The map depiction section 14 generates map depiction data that is necessary for the display of map information on the basis of map data stored in the buffer memory 10.

The VRAM 16 temporarily stores therein the map depiction data provided by the map depiction section 14.

The vehicle position calculation section 20 calculates the vehicle position and the vehicle direction on the basis of detection data provided by the vehicle position detection section 4. When the calculated vehicle position is off the road on the map of the map data, the vehicle position calculation section 20 executes map matching processing for correcting the vehicle position.

The input processing section 22 provides commands to respective sections within the navigation controller 1 to allow operation to be executed in accordance with various kinds of operation instructions received from the manipulation section 5. In cases where the display of the manipulation screen is required, the input processing section 22 provides instructions to the manipulation screen generation section 26.

The cursor position calculation section 24 calculates the cursor position in accordance with instructions from the input processing section 22. For instance, the cursor position calculation section 24, when receiving an instruction that the map is to be scrolled, acquires the current vehicle position from the vehicle position calculation section 20 to set as the initial cursor position, then calculates the cursor position (latitude, longitude) after movement of the vehicle while matching an operation instruction executed using the manipulation section 5.

The manipulation screen generation section 26 prepares depiction data for displaying the manipulation screen in accordance with an instruction from the input processing section 22.

The mark depiction section 28 generates depiction data by which a predetermined vehicle position mark is displayed at the vehicle position after being subjected to map matching processing, or a predetermined cursor mark is displayed at the cursor position.

The position information extraction section 30 extracts the postal code as position information corresponding to this position on the basis of the vehicle position received from the vehicle position calculation section 20. Such processing is capable of being executed easily by using the area search database included in the map data.

The received information extraction section 32 extracts necessary information from among various kinds of information included in the data broadcast received by the digital broadcast receiver 6 on the basis of the position information (postal code) received from the position information extraction section 30 and predetermined extraction conditions (described later) stored in the extraction conditions storage section 34. Hereinafter, this extracted information is called "received information."

The extraction conditions storage section 34 stores therein predetermined extraction conditions set by the user.

FIG. 2 illustrates one example of the extraction conditions stored in the extraction conditions storage section 34. The extraction conditions contain (1) "genre conditions" that indicate what genre of information is to be extracted, and (2) "area conditions" that indicate conditions about the area when extracting the information. In the example illustrated in FIG. 2, the weather forecast, the news, the traffic information and so forth are specified as the "genre conditions". In this case, three kinds of information—the weather forecast, the news, and the traffic information—are extracted by the received information extraction section 32. Furthermore, "post code following up mode" is specified as the "area conditions". This post code following up mode effects pattern processing for changing the area matched with the extraction target of the information while following every change of the postal code when the postal code is provided from the position information extraction section 30 as the position information. As another pattern processing other than this pattern processing, it is possible to set a "post code fixed mode" in which only the area corresponding to the predetermined postal code set beforehand is taken to be the target area.

The received information depiction section 36 generates depiction data in order to display received information extracted by the received information extraction section 32. For that reason, the received information such as the weather forecast and so forth is displayed while being superimposed at a predetermined position over the map on the screen of the display device 8. A specific display example will be described later.

The image combination section 40 executes image combination to superimpose map depiction data read out from the VRAM 16 that is associated with the vehicle position and/or the cursor position, depiction data received from the mark depiction section 28 and/or the manipulation screen generation section 26, and depiction data received from the received information depiction section 36 to provide combined depiction data to the display device 8.

The above-described digital broadcast receiver 6 corresponds to the reception section, and the received information extraction section 32, the extraction conditions storage section 34, the received information depiction section 36, the image combination section 40, and the display device 8 correspond to the received information display section.

The operation of the navigation system of the present embodiment will now be described. For instance, the "post code following up mode" is set as the "area conditions" in the above-described extraction conditions, and the operational procedure will be described with received information such as the weather forecast to be superimposed for display on the map.

FIG. 3 is a flowchart illustrating the operational procedure of the navigation system when the received information is to be superimposed for display on the map. Further, it is supposed that the processing steps illustrated in FIG. 3 are executed repeatedly in every predetermined time (for instance, one second).

When the current vehicle position is calculated by the vehicle position calculation section 20 on the basis of a detection result provided by the vehicle position detection section 4 (STEP 100), the position information extraction section 30 extracts a postal code corresponding to the calculated vehicle position (latitude, longitude) (STEP 101).

Next, the position information extraction section 30 judges whether the extracted postal code has changed in comparison with the postal code extracted in the previous processing time (STEP 102). Moreover, it is supposed that the postal code extracted in the previous processing time is stored in an internal memory (not illustrated) of the position information extraction section 30. Further, it is supposed that in the initial processing immediately after application of power, a positive judgment is executed at STEP 102 notwithstanding contents of the postal code stored in the internal memory. Furthermore, in the judgment at STEP 102, a comparison can be made between the total digits of the postal code; however, the comparison may appropriately be a partial comparison of the upper three digits.

In cases where the postal code has changed, a positive judgment is executed at STEP 102, and the received information extraction section 32 selects for extraction the necessary received information from among the contents of the data broadcast in such a way as to send an instruction to the digital broadcast receiver 6 on the basis of this postal code and the extraction conditions read out from the extraction conditions storage section 34 (STEP 103).

When the received information is extracted, the depiction data for displaying the received information is generated by the received information depiction section 36, and the received information is displayed on the screen of the display device 8 (STEP 104).

Subsequently, returning to the aforementioned STEP 100, the processing is repeated, thereby the display contents of the received information are updated each time the postal code extracted in response to the vehicle position is changed.

When the postal code is not changed, a negative judgment is performed at the aforementioned STEP 102. In this case, processing returns to the aforementioned STEP 100 with no display of updated received information, and the processing beginning at STEP 100 is repeated.

Figure 4:
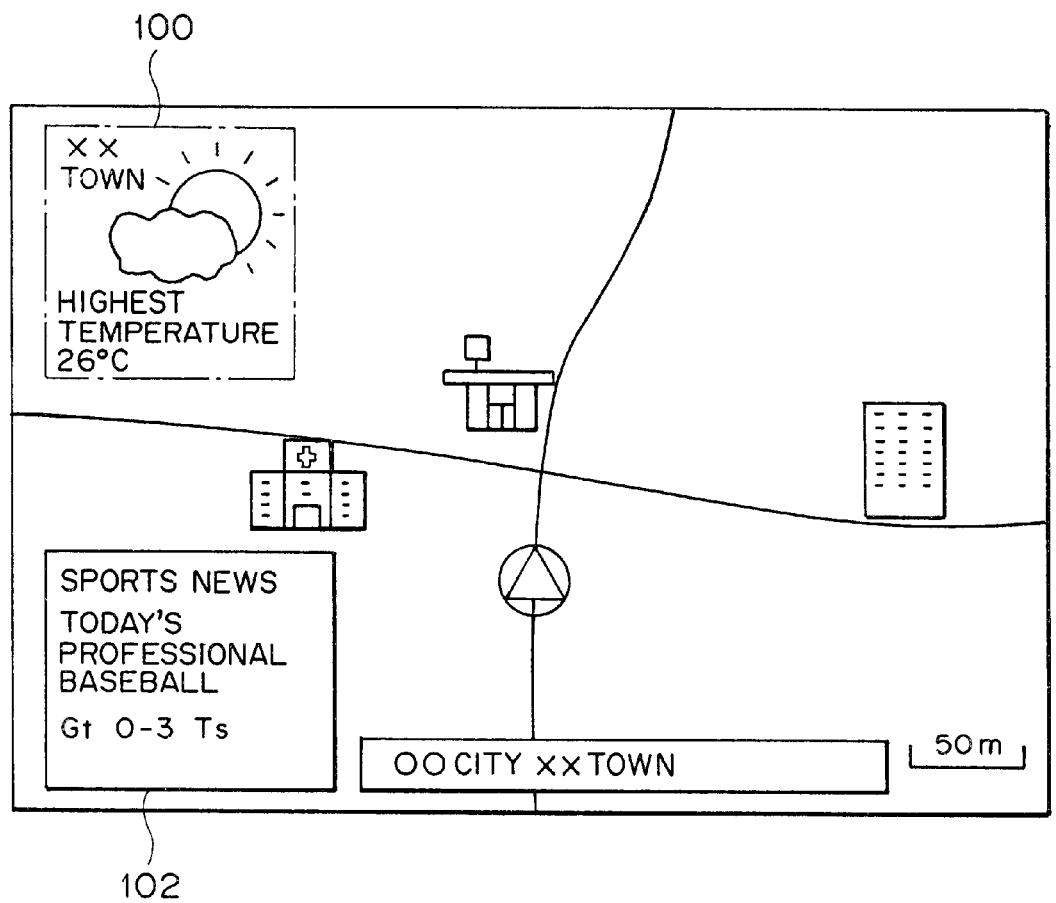
FIG. 4 is a display example of the received information which is superimposed on the map for display.

FIG. 4 is a display example of the received information superimposed for display on the map. Here, the map of the area surrounding the vehicle position in "○○City XX Town" is displayed, and respective received information is displayed in the vicinity of the top left and the vicinity of the bottom left on the map. Weather forecast information 100 displayed at the top left is the received information that identifies the weather forecast corresponding to the area to which "○○City XX Town" belongs. In the example illustrated in FIG. 4, a graphic symbol (combination of cloud mark and sun mark) indicating the weather forecast of "cloudy with intermittent sun" and a projected highest temperature (character string of "highest temperature 26° C.") are displayed. Furthermore, news information 102 displayed at the bottom left is received information identifying news, e.g., sports news which indicates the result of a professional baseball game.

Thus, in the navigation system of the first embodiment, since the postal code of the area corresponding to the current position of the vehicle is extracted, and the received information relevant to the area specified by this postal code is selectively extracted for display, in the course of travel, it is possible to simplify the user's manipulation in acquiring information relevant to the current position of the vehicle.

[Second Embodiment]

In the aforementioned first embodiment, the received information relevant to the vehicle position is extracted for display. However, on the occasion that the map is scrolled, the position on the map corresponding to the cursor position may specify the received information to be extracted for display.

Figure 5:
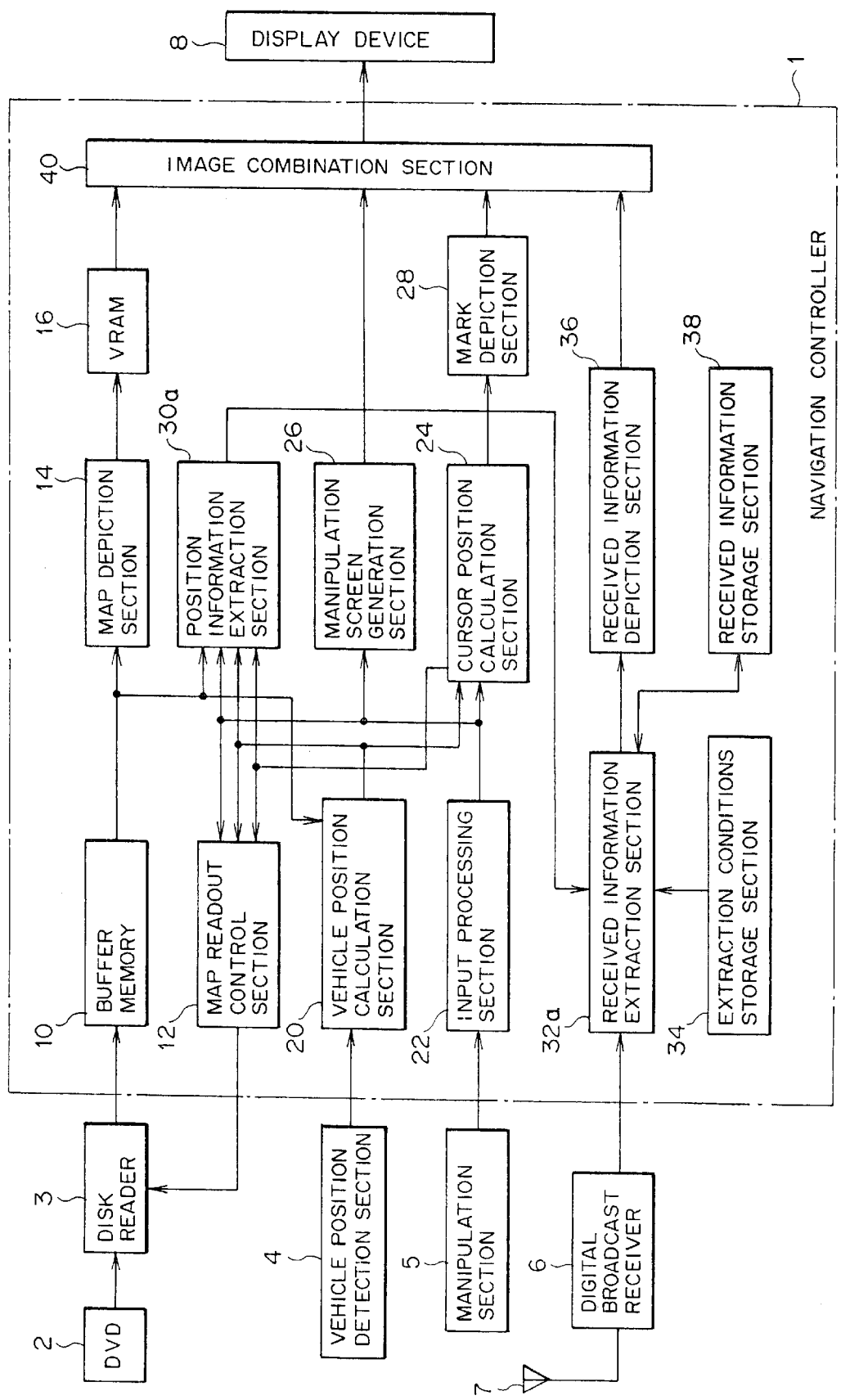
FIG. 5 is a block diagram illustrating the configuration of a navigation system of a second embodiment.

FIG. 5 is a block diagram illustrating the overall configuration of a navigation system of a second embodiment. The navigation system illustrated in FIG. 5 differs from the navigation system of the first embodiment illustrated in FIG. 1 in that the position information extraction section 30 and the received information extraction section 32 are replaced by a position information extraction section 30a and a received information extraction section 32a, and a received information storage section 38 is added. The configuration of the navigation system will be described below with attention given to these differences.

The position information extraction section 30a extracts an area name on the basis of the cursor position provided from the cursor position calculation section 24 as position information corresponding to this position. Specifically, in the present embodiment, the area name, regional name such as ○○ district (for instance, Kanto district, Tohoku district and so forth), prefectural and city government name, local authority name, and so forth, may be extracted. Data relevant to the area name is contained in the aforementioned area search database. Accordingly, it is possible to search for the area name corresponding to that position in such a way as to specify the position based on latitude and longitude.

The received information extraction section 32a extracts the necessary received information from among the contents of the data broadcast received by the digital broadcast receiver 6 or from among data (described later) stored in the received information storage section 38 on the basis of the position information provided from the position information extraction section 30a.

Further, the received information extraction section 32a extracts information (for instance, event information) that is not always necessary in realtime from among the various kinds of information included in the data broadcast, for storing in the received information storage section 38. The stored information becomes the target of extraction on the occasion that the received information extraction section 32a extracts the received information on the basis of the predetermined extraction conditions. For instance, when extracting the event information, the received information extraction section 32a extracts the event information from among the contents of the data broadcast being received by the digital broadcast receiver 6 at that time, and also extracts the event information from among the data stored in the received information storage section 38. The extraction conditions storage section 34 stores therein predetermined extraction conditions that are set by the user.

FIG. 6 illustrates one example of the extraction conditions stored in the extraction conditions storage section 34 of the second embodiment. As described above (referring to FIG. 2), the extraction conditions contain (1) "genre conditions" that indicate what genre of information is to be extracted and (2) "area conditions" that indicate conditions about an area when extracting the information. In the example illustrated in FIG. 6, the weather forecast, event information, traffic information and so forth are specified as the "genre conditions". In this case, three kinds of information—the weather forecast, event information, and traffic information—are extracted by the received information extraction section 32a. Furthermore, "area name following up mode" is specified as the "area conditions". This area name following up mode effects pattern processing for changing the area matched with the extraction target of the information while following every change of the area name when the area name is provided from the position information extraction section 30a as the position information. As another pattern processing other than this pattern processing, it is possible to set an "area name fixed mode" in which only the area corresponding to the predetermined area name set beforehand is taken to be the target area.

The aforementioned received information extraction section 32a, the extraction conditions storage section 34, the received information depiction section 36, the image combination section 40 and the display device 8 correspond to the received information display section, while the manipulation section 5, the input processing section 22 and the cursor position calculation section 24 correspond to the instruction section, and the received information storage section 38 corresponds to the storage section.

The operational procedure of the present embodiment will now be described for the case that the received information is displayed while following the movement of the cursor position at the time of map scrolling. Moreover, it is assumed that, on the screen of the display device 8, the map is displayed on the left half, while the received information is displayed on the right half (a specific example will be described later).

Figure 7:
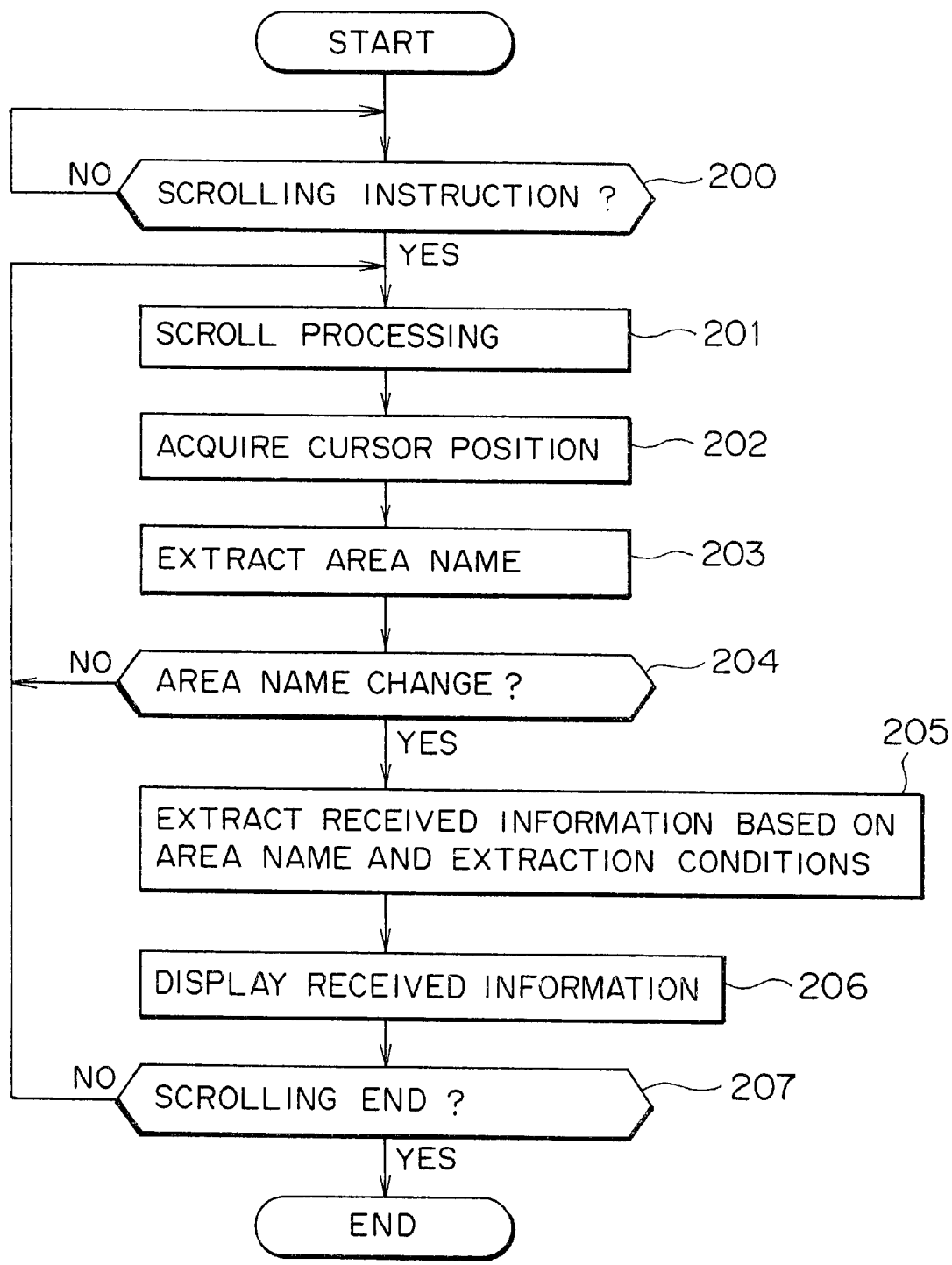
FIG. 7 is a flowchart illustrating the operational procedure of the navigation system when the received information is displayed as to follow movement of a cursor position when the map is scrolled.

FIG. 7 is a flowchart illustrating the operational procedure of the navigation system when the received information is displayed while following the movement of the cursor position at the time of map scrolling.

The input processing section 22 judges whether the predetermined scroll instruction has been given on the basis of a signal received from the manipulation section 5 (STEP 200). When the scroll instruction has been given, a positive judgment is made, and an instruction is sent to the cursor position calculation section 24 to perform a predetermined scroll processing (STEP 201).

Specifically, the cursor position calculation section 24 which receives the instruction from the input processing section 22 calculates the cursor position (latitude, longitude) sequentially, depending on the manipulation conditions of the cursor key in the manipulation section 5. This way, scrolling of the map is executed so that the map information surrounding the cursor position is displayed sequentially.

The position information extraction section 30a acquires the cursor position calculated by the cursor position calculation section 24 with a predetermined timing (for instance, every one second) in parallel with the scroll processing indicated in STEP 201 (STEP 202). The area name corresponding to the acquired cursor position is then extracted (STEP 203).

Next, the position information extraction section 30a judges whether the extracted area name has changed from the area name extracted at the time of previous processing (STEP 204). Incidentally, it is assumed that the extracted area name at the time of previous processing is stored in an internal memory (not illustrated) of the position information extraction section 30a. Further, it is assumed that in the initial processing immediately after application of power, a positive judgment is performed at STEP 204 notwithstanding the contents of the area name stored in the internal memory.

When the area name has changed, a positive judgment is made in STEP 204, and the received information extraction section 32a extracts the received information on the basis of this area name (STEP 205). Specifically, the received information extraction section 32a sends an instruction to the digital broadcast receiver 6, and extracts selectively the necessary received information from among the contents of the data broadcast. Further, the received information extraction section 32a also extracts the received information from among the data stored in the received information storage section 38.

When the received information is extracted, the depiction data for displaying this received information is generated by the received information depiction section 36, and the received information is displayed on the screen of the display device 8 (STEP 206).

Next, the input processing section 22 judges whether a manipulation instruction to the effect that the scroll processing is to end has been executed (STEP 207). When this manipulation instruction has not been executed, a negative judgment is made at STEP 207, and the processing returns to the aforementioned STEP 201. In the case where the manipulation instruction is given to end scroll processing, a positive judgment is made at STEP 207. The cursor position calculation section 24 is notified of this by the input processing section 22, and scroll processing ends.

Figure 8:
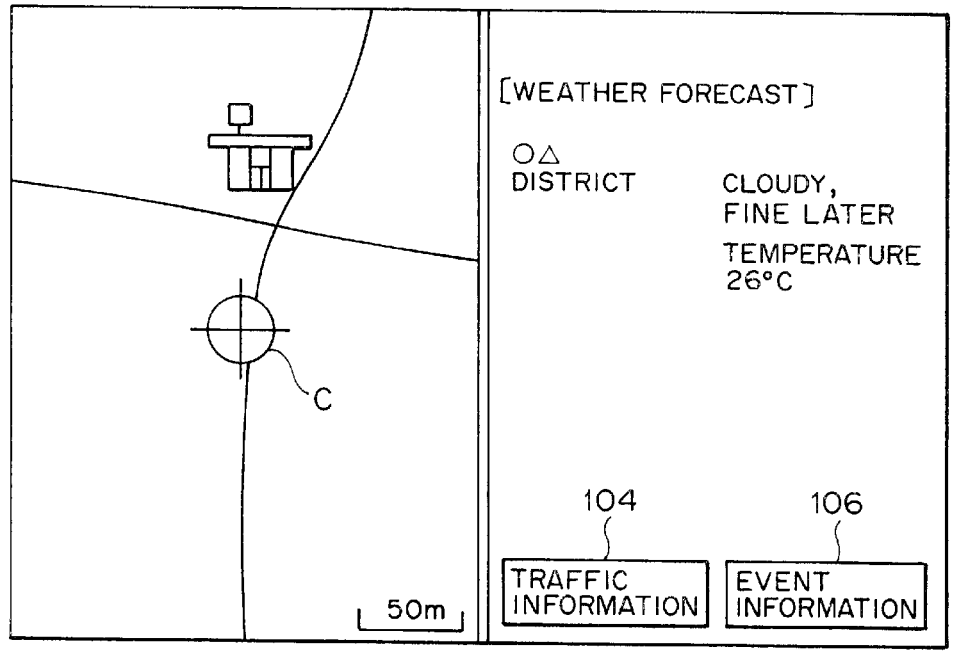
FIG. 8 is a display example of received information when the map is scrolled.

FIG. 8 is a display example of the received information at the time of map scrolling. In FIG. 8, the map information with the cursor C as the center is displayed on the left side of the screen, and the received information relevant to "○△ district" (the area name extracted corresponding to the current position of the cursor C) is displayed. Only the "weather forecast" is displayed in the display area of the received information on the right side of the screen, and other information can be displayed by selecting an icon 104 or an icon 106. Further, in cases where the map information on the left side of the screen is scrolled, and the area name corresponding to the current position of the cursor C is changed, the contents of the received information on the right side of the screen is updated for display. Consequently, the user can manipulate the cursor key of the manipulation section 5 to scroll the map, and the user is capable of acquiring the received information relevant to the position by causing the required position to be displayed on the screen.

Further, in cases where the icon 104 is selected by use of the manipulation section 5, the display content of the received information is switched to traffic information from the weather forecast. Similarly, in cases where the icon 106 is selected, the display content of the received information is switched to event information from the weather forecast. Thus, in cases where the content of the displayed information is narrowed down to one, and other display content is capable of being obtained by selecting a predetermined icon, it is possible to display more contents than one received information.

Figure 9:
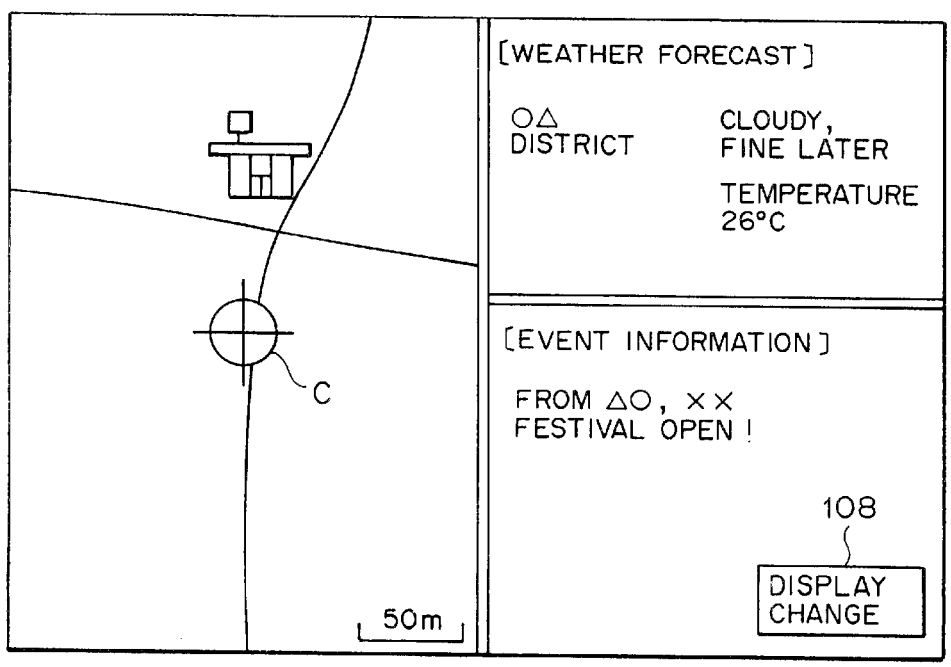
FIG. 9 is another display example of received information when the map is scrolled.

FIG. 9 is another display example of the received information at the time of map scrolling. In FIG. 9, the display area of the received information on the right side of the screen is further divided into two parts, and the received information is displayed on respective areas. In this display example, there is the advantage that it is possible to display a plurality of received information simultaneously. Further, in cases where the user wants to allow other received information to be displayed on the screen, the display content of the received information can be switched by selecting an icon 108 by use of the manipulation section 5. In the example illustrated in FIG. 9, for instance, when the icon 108 is selected, the event information is not displayed, the display of the weather forecast moves to the lower display position, and traffic information is displayed at the upper display position.

Further, in the aforementioned display example illustrated in FIG. 8 or FIG. 9, the display content of the received information may be switched automatically in predetermined time intervals. Specifically, in the case of the display example illustrated in FIG. 8, the content of the received information to be displayed may be switched cyclically, for instance every several seconds, in the order of the weather forecast, traffic information, and event information. Similarly, in the case of the display example illustrated in FIG. 9, the display state of respective received information can be made to switch cyclically to be displayed at the upper position on the display area, then the lower position, then no display.

Thus, in the navigation system of the second embodiment, the area name of the area corresponding to the cursor position at the time of map scrolling is identified, and the received information relevant to the area specified by the area name is extracted for display selectively. Therefore, it is possible to simplify the user's manipulation in acquiring information relevant to a required position on the map. Further, since the received contents are stored in the received information storage section 38, it becomes possible to extract information relevant to the area from among the data stored in the received information storage section 38 in addition to the reception contents received by the digital broadcast receiver 6 in real-time. Thus there is the advantage that it is possible to increase the amount of information to be extracted.

MODIFIED EXAMPLE

The present invention is not limited to the aforementioned respective embodiments, and various modifications are possible within the scope of the present invention. For instance, in the aforementioned first embodiment, the "postal code" is extracted as the position information. However, "area name" can also be selected. Similarly, in the second embodiment, the "area name" is extracted as the position information. However, the "postal code" can also be selected.

Further, the position information is not limited to the postal code or the area name. As another example, a telephone number also can be selected. In this case, for example, part of the area code corresponding to the vehicle position or the cursor position is extracted and is taken to be the position information. Furthermore, the telephone number such as the area code is added to the information transmitted by the data broadcast as target area information.

Further, in the first embodiment, received information is displayed in the vicinity of top left and the vicinity of bottom left on the map, while in the second embodiment, the received information is displayed on the right half of the display screen. However, the display mode may be made to switch from a mode in which the map is displayed on the entire screen while the received information is not displayed to a display mode in which the map and the received information are displayed simultaneously.

Figure 10:
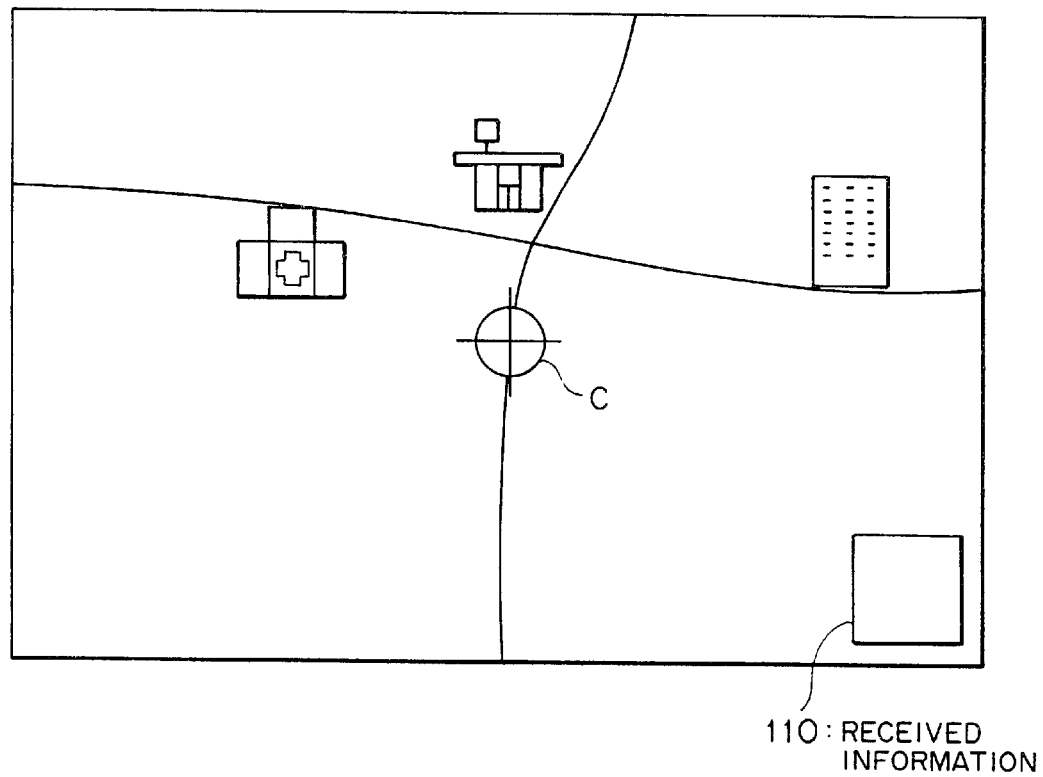
FIG. 10 illustrates one example of a display mode for displaying the received information as circumstances demand.

FIG. 10 illustrates one example of a display mode in which the received information is displayed as necessary. In FIG. 10, the map is illustrated and map scrolling is executed. In the vicinity of the bottom right on the display screen, an icon 110 is displayed for switching the display mode. When the icon 110 is selected, the display conditions are switched into the display mode illustrated in the aforementioned FIG. 8 or FIG. 9 (displaying the received information on the right half). Further, in the first embodiment, the map of the area surrounding the vehicle position can be displayed on the entire display screen in the same way as FIG. 10, and when the icon 110 is selected, the display conditions are switched into the display mode illustrated in FIG. 4 described-above (superimposing the display of the received information on the map). Thus, the received information is displayed when the user wishes to view it, while when the user does not wish to view the received information, the display conditions can be switched so that the map is displayed with a wide range by using the entire display screen.

Further, in the second embodiment, the necessary received information is extracted selectively from among the content of the data broadcast received by the digital broadcast receiver 6, and also from among the data stored in the received information storage section 38. However, the received information may be extracted by using only the data stored in the received information storage section 38. In this case, even when the data broadcast is not received by the digital broadcast receiver 6, it is possible to extract for display the information relevant to the area.

According to the present invention, since the position information corresponding to the current position of the vehicle and/or the position on the map is extracted automatically, and the information relevant to the specified area is extracted selectively for display, it is possible to simplify user manipulation when information relevant to the area is to be acquired.

What is claimed is:

1. A received information processing apparatus comprising:
   a reception section for receiving information delivered by use of a broadcasting medium;
   a position information extraction section for extracting position information for specifying an area; and
   a received information display section for selectively extracting for display information relevant to said area from among said information received by said reception section, on the basis of said position information extracted by said position information extraction section.

2. The received information processing apparatus as claimed in claim 1, further comprising:
   a vehicle position detection section for detecting a current position of the vehicle, wherein said position information extraction section extracts said position information matching with the current position of said vehicle detected by said vehicle position detection section.

3. The received information processing apparatus as claimed in claim 1, further comprising:
   a specification section for specifying a position on a map, wherein said position information extraction section extracts said position information matching with the position on said map specified by said specification section.

4. The received information processing apparatus as claimed in claim 1, further comprising:
   a storage section for storing said information received by said reception section, wherein said received information display section selectively extracts for display said information relevant to said area on the basis of said position information from among said information stored in said storage section.

5. The received information processing apparatus as claimed in claim 1, wherein said position information extracted by said position information extraction section comprises a postal code.

6. The received information processing apparatus as claimed in claim 1, wherein said position information extracted by said position information extraction section comprises a telephone number.

7. The received information processing apparatus as claimed in claim 1, wherein said position information extracted by said position information extraction section comprises an area name.

8. The received information processing apparatus as claimed in claim 1, wherein said received information display section displays information extracted selectively and a map of a target area.

9. The received information processing apparatus as claimed in claim 1, wherein information relevant to said area is at least one from among weather information, traffic information and event information.

10. The received information processing apparatus as claimed in claim 1, further comprising:
    an extraction conditions storage section for storing genre of information, wherein said received information display section extracts for display information which is associated with said area and which belongs to said genre stored in said extraction conditions storage section from among information received by said reception section.

11. A received information processing method comprising:
    receiving a data broadcast which delivers information relevant to an area by use of a broadcasting medium, along with position information;
    detecting a vehicle position;
    extracting position information corresponding to said vehicle position; and
    extracting for display information relevant to the area of the vehicle position from among said data broadcast based on said position information.

12. The received information processing method as claimed in claim 11, further comprising:
    extracting for display information relevant to the area of said vehicle position; and
    displaying simultaneously a map to which said vehicle position belongs.

13. The received information processing method as claimed in claim 11, wherein said position information comprises postal codes, and information relevant to the area matched with said postal code is extracted for display from among said data broadcast.

14. The received information processing method as claimed in claim 11, wherein said position information comprises telephone numbers, and information relevant to the area matched with said telephone number is extracted for display from among said data broadcast.

15. The received information processing method as claimed in claim 11, wherein said position information comprises area names, and information relevant to the area matched with said area name is extracted for display from among said data broadcast.

16. The received information processing method as claimed in claim 11, further comprising:

setting genre of information which is to be extracted from among said information; and extracting for display information which is associated with said area and which belongs to said set genre from among said information.

17. A received information processing method comprising:

receiving a data broadcast which delivers information relevant to an area by use of a broadcasting medium, along with position information;

extracting position information for specifying an area to which a position specified on the map belongs; and extracting for display information relevant to said area on the basis of said position information.

18. The received information processing method as claimed in claim 17, further comprising:

extracting for display information relevant to said area; and displaying simultaneously a map of an area surrounding said specified position.

19. The received information processing method as claimed in claim 17, wherein said information relevant to the area is at least one from among weather information, traffic information and event information.

20. The received information processing method as claimed in claim 17, further comprising:

storing said information which is received; and selectively extracting for display said information relevant to said area from among said information stored on the basis of said position information.

* * * * *